UNITED STATES PATENT OFFICE.

WILLIAM PEARSON, OF CHICAGO, ILLINOIS.

IMPROVEMENT IN COMPOUNDS TO PREVENT INCRUSTATION IN STEAM-BOILERS.

Specification forming part of Letters Patent No. 132,369, dated October 22, 1872.

*To all whom it may concern:*

Be it known that I, WILLIAM PEARSON, of Chicago, in the county of Cook and State of Illinois, have invented a new and useful Improvement in Anti-Incrustation Fluids for Steam-Boilers; and I do declare that the following is a true and accurate description thereof.

My invention consists in a compound of chemicals, which, when mixed with the water before the same enters the boiler, will prevent incrustation in the same by destroying or neutralizing the elements of which the incrustation is composed.

This fluid I prepare in the following manner: For ten gallons of anti-incrustation fluid I take two ounces of tannic acid, two ounces of quercetinic acid, two ounces of gallic acid, and two ounces of ellagic acid. I mix these four acids with eight gallons of water, into which has been dissolved half a pound of white glue and one pound of carbonate of ammonia, and let this mixture boil for one hour. In a separate vessel I mix one pound of palm-oil and a quart of sweet almond or hickory oil, with half a pound of oxide of iron, and melt these together over a slow fire. Now I add one pound of oxalic acid, and expose the whole mixture to a gentle heat (not to boil) for one hour. The contents of both vessels I now mix, and add human urine enough to make up the ten gallons. I strain this fluid through a very fine sieve to remove any solid particles, after which it is ready for use.

The following directions should be observed for using this fluid: For locomotive-engine boilers I put into the tank, which contains the feed-water, one pint of the above-described fluid about three times a day, which amount will be sufficient to keep the inside surfaces of the boiler clean and free of any incrustation. The feed-water tank should be washed out from time to time.

For marine and stationary boilers this fluid is used in proportion to the size of and pressure of steam in the boiler; and it may either be mixed with the water before entering the boiler, or it may be fed into the boiler direct by means of a force-pump.

This compound or fluid has no injurious effect upon iron or copper. It will prevent foaming of the water, will prevent incrustation and will lubricate all the working parts of the steam-engine which are exposed to the direct action of the steam, as piston and slide-valve. Overdosing the boiler with this fluid will do no harm.

The above-specified proportions of the ingredients may be altered for different kinds of water.

What I claim as my invention, and desire to secure by Letters Patent, is—

An anti-incrustation fluid for steam-boilers, of the ingredients and in the proportions as herein set forth.

WILLIAM PEARSON.

Witnesses:
WM. H. LOTZ,
HENRY SPRINGER.